(12) United States Patent
Omura

(10) Patent No.: US 12,528,893 B2
(45) Date of Patent: Jan. 20, 2026

(54) CURABLE COMPOSITION

(71) Applicant: THREEBOND CO., LTD., Tokyo (JP)

(72) Inventor: Ai Omura, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 846 days.

(21) Appl. No.: 17/755,996

(22) PCT Filed: Nov. 25, 2020

(86) PCT No.: PCT/JP2020/043861
§ 371 (c)(1),
(2) Date: May 13, 2022

(87) PCT Pub. No.: WO2021/106944
PCT Pub. Date: Jun. 3, 2021

(65) Prior Publication Data
US 2022/0389129 A1    Dec. 8, 2022

(30) Foreign Application Priority Data

Nov. 26, 2019  (JP) ................................. 2019-213030

(51) Int. Cl.
*C08F 20/32* (2006.01)
*B01J 31/02* (2006.01)
(Continued)

(52) U.S. Cl.
CPC ............ *C08F 20/32* (2013.01); *B01J 31/0222* (2013.01); *C08F 2/40* (2013.01); *C08F 2/44* (2013.01);
(Continued)

(58) Field of Classification Search
CPC .......... C08F 222/1025; C08F 220/1811; C08F 220/20; C08F 222/102; C08F 222/103; C09D 4/00; C08K 5/46; C08L 33/10
See application file for complete search history.

(56) References Cited

U.S. PATENT DOCUMENTS

| 4,656,229 A | 4/1987 | Chiao |
| 5,389,700 A | 2/1995 | Sasaki |

(Continued)

FOREIGN PATENT DOCUMENTS

| CN | 108495870 A | 9/2018 |
| CN | 113165371 A | 7/2021 |

(Continued)

OTHER PUBLICATIONS

European Patent Office, "Extended European Search Report" dated Jan. 23, 2024 in connection with the related European patent application No. 20894467.8, 14 pages.

(Continued)

*Primary Examiner* — Eli D. Strah
(74) *Attorney, Agent, or Firm* — LUCAS & MERCANTI, LLP

(57) ABSTRACT

The present invention provides a curable composition capable of securing delayed curing time for carrying out a work such as laminating or tightening after carrying out irradiation with an energy ray or heating and capable of exhibiting delayed curing property after that, regardless of whether an adherend is transparent or not. The present invention is a curable composition comprising components (A) to (C): a component (A): a compound having a (meth) acryloyl group in a molecule; a component (B): saccharin; and a component (C): at least one of a photocationic catalyst as a component (C-1) and a thermal cationic catalyst as a component (C-2).

10 Claims, 1 Drawing Sheet

(51) Int. Cl.
*C08F 2/40* (2006.01)
*C08F 2/44* (2006.01)
*C08F 2/48* (2006.01)
*C08F 2/50* (2006.01)
*C08F 20/06* (2006.01)
*C08F 20/34* (2006.01)
*C08F 222/10* (2006.01)
*C08K 5/00* (2006.01)
*C08K 5/46* (2006.01)
*C08K 5/47* (2006.01)
*C09D 4/00* (2006.01)
*C09J 4/06* (2006.01)
*C09J 5/06* (2006.01)
*C09J 11/06* (2006.01)
*C09J 133/04* (2006.01)
*C09J 133/10* (2006.01)
*C08F 20/10* (2006.01)
*C08F 122/10* (2006.01)

(52) U.S. Cl.
CPC .................. *C08F 2/48* (2013.01); *C08F 2/50* (2013.01); *C08F 20/06* (2013.01); *C08F 20/34* (2013.01); *C08F 222/1025* (2020.02); *C08K 5/0025* (2013.01); *C08K 5/46* (2013.01); *C08K 5/47* (2013.01); *C09D 4/00* (2013.01); *C09J 4/06* (2013.01); *C09J 5/06* (2013.01); *C09J 11/06* (2013.01); *C09J 133/04* (2013.01); *C09J 133/10* (2013.01); *C08F 20/10* (2013.01); *C08F 122/1006* (2020.02)

(56) References Cited

U.S. PATENT DOCUMENTS

| | | | |
|---|---|---|---|
| 5,411,998 | A | 5/1995 | McArdle et al. |
| 6,329,442 | B1 | 12/2001 | Sugita et al. |
| 9,994,510 | B2 | 6/2018 | Messana et al. |
| 2014/0371398 | A1 | 12/2014 | Hashimoto et al. |
| 2017/0369618 | A1 | 12/2017 | Gerard et al. |
| 2020/0040131 | A1 | 2/2020 | Fukamoto et al. |
| 2021/0207004 | A1 | 7/2021 | Midorikawa et al. |
| 2022/0055088 | A1 | 2/2022 | Omura |

FOREIGN PATENT DOCUMENTS

| | | | |
|---|---|---|---|
| EP | 0581532 | A2 | 2/1994 |
| EP | 0659859 | A1 | 6/1995 |
| EP | 1038935 | A1 | 9/2000 |
| JP | H05117311 | A | 5/1993 |
| JP | H06-108013 | A | 4/1994 |
| JP | H1150014 | A * | 2/1999 |
| JP | 2004-285119 | A | 10/2004 |
| JP | 2005240005 | A * | 9/2005 |
| JP | 2013-076967 | A | 4/2013 |
| JP | 2017214499 | A * | 12/2017 |
| JP | 2018-159069 | A | 10/2018 |
| WO | 2013/084753 | A1 | 6/2013 |
| WO | 2016/102899 | A1 | 6/2016 |

OTHER PUBLICATIONS

Notice of Reasons for Refusal, dated Aug. 27, 2024 for corresponding Japanese Application No. 2021-561458, 10 pages, with English Translation.
Office Action dated Dec. 1, 2023, for the corresponding Chinese Patent Application No. 202080079953.5, with English translation.
PCT, International Search Report for the corresponding patent application No. PCT/JP2020/043861, dated Jan. 26, 2021, with English translation.
Office Action dated Feb. 16, 2023 for the corresponding Chinese patent application No. 202080079953.5, with English translation.
CNIPA, Office Action for the related Chinese Application No. 202080079953.5, dated on Apr. 20, 2024, with English translation, 14 pages.
Office Action, issued on May 27, 2025 for the corresponding Korean Patent Application No. 10-2022-7012273, 17 pages, with English translation.

* cited by examiner

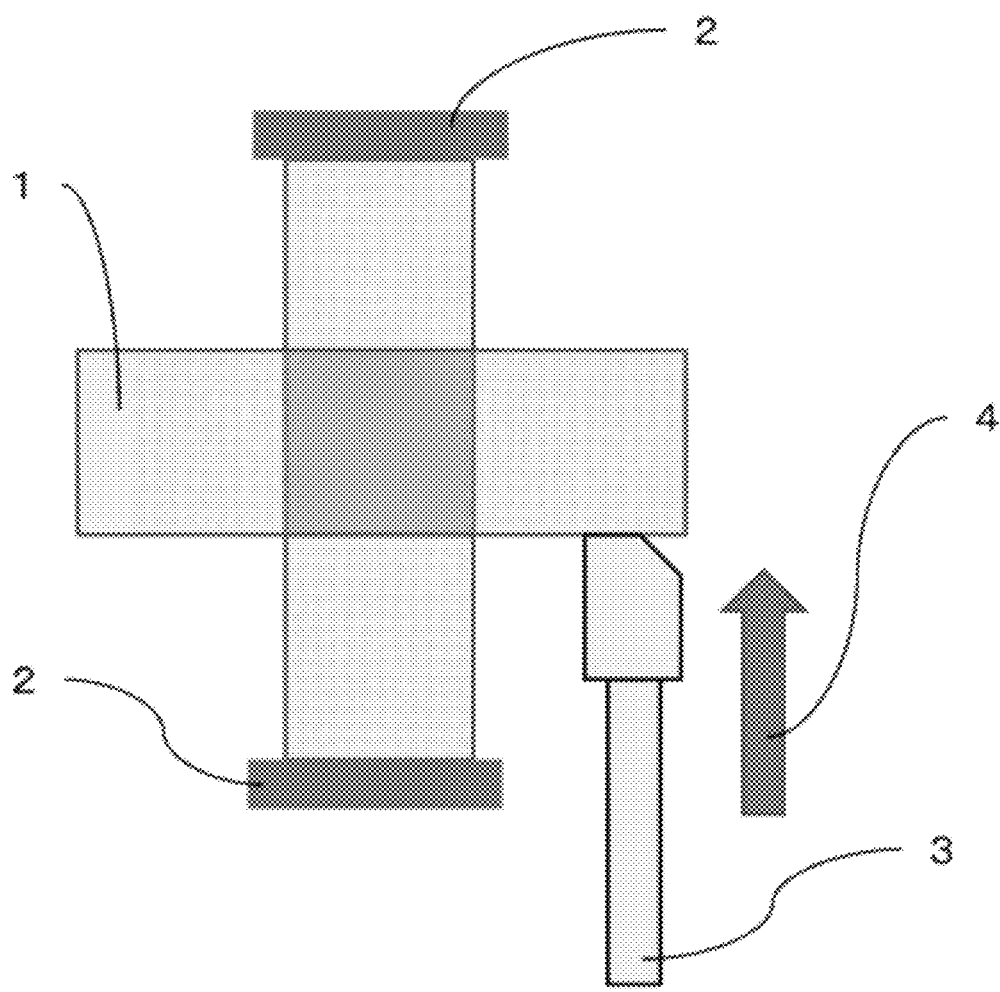

CURABLE COMPOSITION

CROSS REFERENCE TO RELATED APPLICATION

This Application is a 371 of PCT/JP2020/043861 filed on Nov. 25, 2020 which, in turn, claimed the priority of Japanese Patent Application No. 2019-213030 filed on Nov. 26, 2019, both applications are incorporated herein by reference.

TECHNICAL FIELD

The present invention relates to a curable composition having delayed curing property that the composition is not cured by the trigger of irradiation with an active energy ray (energy ray) or heating and is cured after specific time has elapsed since completion of irradiation or since completion of heating. Hereinafter, the property that a substance is uncured immediately after completion of irradiation with an energy ray or immediately after completion of heating and is cured after specific time has elapsed since completion of irradiation with an energy ray or since completion of heating is called delayed curing property, and the specific time is called delayed curing time.

BACKGROUND ART

It is conventionally known that an epoxy compound and the like have curability due to light irradiation in the presence of a cationic catalyst. It is known that, by adding a polyalcohol compound, a polyether compound and a plasticizer as retarders to an epoxy compound and a cationic catalyst, a composition having delayed curing property that the composition is not cured immediately after irradiation with an energy ray and is cured after specific time has elapsed is obtained (Japanese Patent Laid-Open No. 2018-159069, corresponding to U.S. Unexamined Patent Application Publication No. 2020/0040131).

SUMMARY OF INVENTION

However, in such a composition having delayed curing property as described in Japanese Patent Laid-Open No. 2018-159069, it is difficult to achieve a balance between the degree of crosslinking acceleration by the cationic catalyst and the degree of crosslinking inhibition by the retarder.

Moreover, cationically polymerizable compounds including an epoxy compound have limited kinds of raw materials as compared with radically polymerizable compounds including a (meth)acrylate compound. Regarding the raw materials, the number of functional groups, main skeleton, modification, etc. affect curability of the composition, and therefore, there is a problem that, for a composition containing a cationically polymerizable compound having limited kinds of raw materials as a main agent, control of delayed curing property is especially difficult.

The present invention has been made in the light of the above circumstances, and it is an object of the present invention to provide a curable composition capable of securing delayed curing time for carrying out a work such as laminating or tightening after carrying out irradiation with an energy ray or heating and capable of exhibiting delayed curing property after that, regardless of whether an adherend is transparent or not.

In order to achieve the above object, the present inventors have earnestly studied, and as a result, they have found a technique relating to a curable composition and have accomplished the present invention.

The gist of the present invention will be described next. The first aspect of the present invention is a curable composition comprising the following components (A) to (C):
  a component (A): a compound having a (meth)acryloyl group in a molecule,
  a component (B): saccharin, and
  a component (C): a photocationic catalyst as a component (C-1).

The second aspect of the present invention is a curable composition comprising the following components (A) to (C):
  a component (A): a compound having a (meth)acryloyl group in a molecule,
  a component (B): saccharin, and
  a component (C): a thermal cationic catalyst as a component (C-2).

The third aspect of the present invention is a curable composition comprising the following components (A) to (C):
  a component (A): a compound having a (meth)acryloyl group in a molecule,
  a component (B): saccharin, and
  a component (C): a photocationic catalyst as a component (C-1) and a thermal cationic catalyst as a component (C-2).

The fourth aspect of the present invention is the curable composition according to any one of the first to the third aspects, further comprising a radical polymerization accelerator as a component (D).

The fifth aspect of the present invention is the curable composition according to the fourth aspect, wherein the component (D) is an amine compound other than the component (B).

The sixth aspect of the present invention is the curable composition according to any one of the first to the fifth aspects, comprising no organic peroxide.

The seventh aspect of the present invention is the curable composition according to the first embodiment, being uncured immediately after completion of irradiation with an energy ray, and being cured after specific time has elapsed since completion of irradiation with an energy ray.

The eighth aspect of the present invention is the curable composition according to the second aspect, being uncured immediately after completion of heating, and being cured after specific time has elapsed since completion of heating.

The ninth embodiment of the present invention is the curable composition according to the third aspect, being uncured immediately after completion of irradiation with an energy ray or immediately after completion of heating, and being cured after specific time has elapsed since completion of irradiation with an energy ray or since completion of heating.

The tenth aspect of the present invention is the curable composition according to any one of the seventh to the ninth aspects, wherein the specific time is 30 seconds to 10 hours.

The eleventh aspect of the present invention is a curing method comprising applying the curable composition according to the seventh or the ninth aspect to an adherend and then irradiating the curable composition with an energy ray.

The twelfth aspect of the present invention is a curing method comprising applying the curable composition according to the eighth or the ninth aspect to an adherend and then heating the curable composition.

BRIEF DESCRIPTION OF DRAWING

FIG. 1 is a view showing a method for pressing a test piece with a certain strength in order to confirm exhibition of delayed curing property.

DESCRIPTION OF EMBODIMENTS

The present invention is a curable composition comprising the following components (A) to (C):
a component (A): a compound having a (meth)acryloyl group in a molecule,
a component (B): saccharin, and
a component (C): at least one of a photocationic catalyst as a component (C-1) and a thermal cationic catalyst as a component (C-2).

According to the curable composition of the present invention, delayed curing time for carrying out a work such as laminating or tightening can be secured after irradiation with an energy ray or heating is carried out, and thereafter, delayed curing property can be exhibited, regardless of whether an adherend is transparent or not.

Details of the present invention will be described next. The component (A) that can be used in the present invention is a compound having a (meth)acryloyl group in a molecule. The component (A) may be any compound as long as it has a (meth)acryloyl group in a molecule, and examples thereof include, but are not limited to, a (meth)acrylic oligomer, a (meth)acrylic monomer, and a (meth)acrylamide monomer. The (meth)acryloyl group is a generic term of an acryloyl group and a methacryloyl group, and a (meth)acrylic acid ester compound is also called a (meth)acrylate.

Examples of the (meth)acrylic oligomers include, but are not limited to, an epoxy-modified (meth)acrylic oligomer, a urethane-modified (meth)acrylic oligomer, and an oligomer having a main skeleton obtained by polymerizing a (meth)acrylic monomer and having a (meth)acryloyl group at an end of the main skeleton. A specific example is a so-called urethane-modified (meth)acrylic oligomer synthesized by reacting a polyhydric polyol with a polyfunctional isocyanate and a compound having a (meth)acryloyl group and a hydroxyl group. The polyhydric polyol may have various skeletons, and those having an ethylene oxide skeleton, a polyester skeleton, a polyether skeleton, a polybutadiene skeleton, a hydrogenated polybutadiene skeleton, etc. can be used. Examples also include, but are not limited to, a bisphenol A type epoxy resin, a bisphenol F type epoxy resin, and an epoxy-modified (meth)acrylic oligomer obtained by the addition of a (meth)acrylic acid to a phenolic novolak resin.

A (meth)acrylic monomer used for forming a main skeleton of the oligomer having a main skeleton obtained by polymerizing a (meth)acrylic monomer and having a (meth)acryloyl group at an end of the main skeleton is preferably a monofunctional monomer having one (meth)acryloyl group in a molecule, and specific examples thereof include, but are not limited to, (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethy-lmethyl (meth)acrylate, 2-perfluorohexylethyl (meth)acrylate, 2-perfluorodecylethyl (meth)acrylate, and 2-perfluorohexadecylethyl (meth)acrylate. In the present invention, the (meth)acrylic monomer can be selected from the above (meth)acrylic monomers and polymerized, but it is preferable to select a (meth)acrylic monomer having a hydrocarbon group.

The weight-average molecular weight of the oligomer having a main skeleton obtained by polymerizing a (meth)acrylic monomer and having a (meth)acryloyl group at an end of the main skeleton is, for example, 1000 or more, and preferably 5000 to 40000. Particularly, a weight-average molecular weight of 5000 or more is preferable because elasticity of a cured product tends to be easily exhibited, and a crack barely occurs in a cured product in the heat resistance test. Meanwhile, a weight-average molecular weight of 40000 or less is preferable because the viscosity does not excessively increase, so that stringing barely occurs upon application of the curable composition. The oligomer having a main skeleton obtained by polymerizing a (meth)acrylic monomer and having a (meth)acryloyl group at an end of the main skeleton can be obtained by various polymerization methods, and the method is not particularly limited, but from the viewpoints of versatility of the monomer and ease of reaction control, a radical polymerization method is preferable. Among the radical polymerizations, preferable is controlled radical polymerization, more preferable is living radical polymerization, and particularly preferable is atom transfer radical polymerization. Examples of methods for introducing a (meth)acryloyl group into a polymer of the (meth)acrylic monomer as a main skeleton, include (1) a method using a reaction of a vinyl-based polymer having a hydroxyl group at an end with a chlorine-, bromine- or hydroxyl group-containing (meth)acrylate compound, (2) a method using a reaction of a vinyl-based polymer having a halogen group at an end with an alkali metal ion- or quaternary ammonium ion-containing (meth)acrylate compound, and (3) a method in which a diisocyanate compound is reacted with a vinyl-based polymer having a hydroxyl group at an end, and a residual isocyanate group is reacted with a hydroxyl group-containing (meth)acrylate to obtain it. These methods are already-known and are described in Japanese Patent Laid-Open No. 61-133201, Japanese Patent Laid-Open No. 11-80250, Japanese Patent Laid-Open No. 2000-38404, Japanese Patent Laid-Open No. 2001-271055, Japanese Patent Laid-Open No. 2002-69121, etc. The oligomer having a main skeleton obtained by polymerizing a (meth)acrylic monomer and having a (meth)acryloyl group at an end of the main skeleton has characteristics that it does not change in quality and does not lose flexibility even in a high-temperature atmosphere such as a 100° C. atmosphere or even in a high-temperature high-humidity atmosphere of 85° C.×85% RH or the like.

The epoxy-modified (meth)acrylic oligomer and the urethane-modified (meth)acrylic oligomer each also preferably have a molecular weight of 1000 or more.

In the present invention, a (meth)acrylic monomer can also be used as the component (A). For the purpose of adjusting the viscosity of the curable composition low and thereby improving workability, the (meth)acrylic oligomer and the (meth)acrylic monomer can be mixed, or the (meth) acrylic oligomer or the (meth)acrylic monomer can be used alone. In the present invention, the amount of the (meth) acrylic monomer is preferably 50 parts by mass or more, more preferably 80 parts by mass or more, and still more preferably 100 parts by mass, in 100 parts by mass of the component (A), from the viewpoint that the delayed curing property is more effectively exhibited. The (meth)acrylic monomers include not only a monofunctional monomer but also a bifunctional monomer, a trifunctional monomer, and a polyfunctional monomer having tetra- or higher-functionality. From the viewpoint that the delayed curing time is more easily controlled, the (meth)acrylic monomer preferably contains a bifunctional monomer, a trifunctional monomer, or a polyfunctional monomer having tetra- or higher-functionality.

Particularly preferably, the component (A) contains a low-molecular weight (meth)acrylic monomer having a molecular weight of less than 1000 because it exhibits an effect of decreasing a viscosity of the curable composition when added. When two or more compounds each having a (meth)acryloyl group in a molecule are used as the component (A), it is more preferable that they are each a low-molecular weight (meth)acrylic monomer having a molecular weight of less than 1000.

In the curable composition of the present invention, the (meth)acrylic monomer preferably includes an acrylic monomer because the time before curing is short.

Specific examples of the monofunctional monomers include, but are not limited to, lauryl (meth)acrylate, stearyl (meth)acrylate, ethylcarbitol (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, adamantanyl (meth)acrylate, benzyl (meth)acrylate, phenyl (meth)acrylate, phenoxyethyl (meth)acrylate, phenoxydiethylene glycol (meth)acrylate, phenoxytetraethylene glycol (meth)acrylate, nonyl phenoxyethyl (meth)acrylate, nonyl phenoxytetraethylene glycol (meth)acrylate, methoxydiethylene glycol (meth)acrylate, ethoxydiethylene glycol (meth) acrylate, butoxyethyl (meth)acrylate, butoxytriethylene glycol (meth)acrylate, 2-ethylhexyl polyethylene glycol (meth) acrylate, 4-hydroxybutyl (meth)acrylate, nonylphenyl polypropylene glycol (meth)acrylate, methoxydipropylene glycol (meth)acrylate, 2-hydroxyethyl (meth)acrylate, 2-hydroxypropyl (meth)acrylate, 2-hydroxybutyl (meth)acrylate, 2-(meth)acryloyloxyethyl succinate, 2-(meth)acryloyloxyethyl hexahydrophthalate, 2-(meth)acryloyloxyethyl-2-hydroxypropyl phthalate, glycerol (meth)acrylate, polyethylene glycol (meth)acrylate, polypropylene glycol (meth) acrylate, epichlorohydrin-modified butyl (meth)acrylate, epichlorohydrin-modified phenoxy (meth)acrylate, N,N-dimethylaminoethyl (meth)acrylate, and N,N-diethylaminoethyl (meth)acrylate.

Preferred monofunctional monomers are a (meth)acrylic monomer having a hydroxyl group in a molecule and/or a (meth)acrylic monomer having a saturated alicyclic structure. Specific examples of the (meth)acrylic monomers having a hydroxyl group include, but are not limited to, 2-hydroxyethyl (meth)acrylate, 2-hydroxypropyl (meth) acrylate, 2-hydroxybutyl (meth)acrylate, 2-(meth)acryloyloxyethyl succinate, 2-(meth)acryloyloxyethyl hexahydrophthalate, and 2-(meth)acryloyloxyethyl-2-hydroxypropyl phthalate. Most preferable are 2-hydroxypropyl methacrylate and/or 2-hydroxyethyl methacrylate. Specific examples of the (meth)acrylic monomers having a saturated alicyclic structure include, but are not limited to, isobornyl (meth)acrylate, dicyclopentanyl (meth) acrylate, cyclohexyl (meth)acrylate, and adamantanyl (meth)acrylate. Most preferable is a (meth)acrylic monomer having an isobornyl skeleton and/or a dicyclopentanyl skeleton. According to one embodiment of the present invention, the component (A) contains both of the (meth)acrylic monomer having a hydroxyl group and the (meth)acrylic monomer having a saturated alicyclic structure in the molecule.

Specific examples of the bifunctional monomers include, but are not limited to, 1,3-butylene glycol di(meth)acrylate, 1,4-butylene glycol di(meth)acrylate, tricyclodecane dimethanol di(meth)acrylate, neopentyl glycol di(meth)acrylate, 1,6-hexane glycol di(meth)acrylate, ethylene glycol di(meth)acrylate, polyethylene glycol di(meth)acrylate, propylene glycol di(meth)acrylate, tripropylene glycol di(meth)acrylate, ethylene oxide (abbreviated to EO hereinafter) modified neopentyl glycol di(meth)acrylate, propylene oxide (abbreviated to PO hereinafter) modified neopentyl glycol di(meth)acrylate, neopentyl glycol hydroxypivalate di(meth)acrylate, caprolactone-modified neopentyl glycol hydroxypivalate di(meth)acrylate, neopentyl glycol-modified trimethylolpropane di(meth)acrylate, stearic acid-modified pentaerythritol di(meth)acrylate, dicyclopentenyl di(meth)acrylate, EO-modified dicylopentenyl di(meth) acrylate, diacryloyl isocyanurate, and EO-modified bisphenol A di(meth)acrylate.

Specific examples of the trifunctional monomers include, but are not limited to, trimethylolpropane tri(meth)acrylate, pentaerythritol tri(meth)acrylate, EO-modified trimethylolpropane tri(meth)acrylate, PO-modified trimethylolpropane tri(meth)acrylate, ethylcyclohexane (ECH)-modified trimethylolpropane tri(meth)acrylate, ECH-modified glycerol tri (meth)acrylate, tris(acryloyloxyethyl) isocyanurate, and isocyanuric acid ethylene oxide-modified di(meth)acrylate.

Specific examples of the polyfunctional monomers having tetra- or higher-functionality include, but are not limited to, ditrimethylolpropane tetra(meth)acrylate, pentaerythritol tetra(meth)acrylate, dipentaerythritol monohydroxypenta (meth)acrylate, alkyl-modified dipentaerythritol penta(meth)acrylate, dipentaerythritol hexa(meth)acrylate, and caprolactone-modified dipentaerythritol hexa(meth)acrylate.

Examples of the (meth)acrylamide monomers that can be used in the present invention include, but are not limited to, dimethylacrylamide, acryloylmorpholine, and diethylacrylamide. Taking the cost and the ease of obtaining into consideration, diethylacrylamide or dimethylacrylamide is preferable. Specific examples of the (meth)acrylamide monomers include DMAA®, ACMO®, and DEAA® manufactured by KJ Chemicals Corporation.

The component (B) that can be used in the present invention is saccharin. Saccharin is a compound represented by the following formula 1.

[Formula 1]

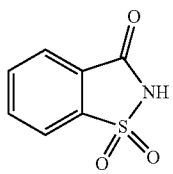

Formula 1

The component (B) is preferably added in an amount of 0.1 to 5.0 parts by mass, and more preferably 0.1 to 3.0 parts by mass, based on 100 parts by mass of the component (A). When the amount of the component (B) is 0.1 part by mass or more, the delayed curing property is more effectively exhibited, and when the amount of the component (B) is 5.0 parts by mass or less, not only is the storage stability improved but also the delayed curing time can be easily secured. When two or more compounds are used as the component (A), the amount of the component (B) added is preferably in the above range based on 100 parts by mass of the total amount of the compounds.

The component (C) that can be used in the present invention is a cationic catalyst. A compound that generates an acid by irradiation with an energy ray (component (C-1): photocationic catalyst) or a compound that generates an acid by heat due to heating (component (C-2): thermal cationic catalyst) can be used as the component (C). The component (C) is sometimes sold in the form in which it is dissolved or dispersed in a solvent or a plasticizer, and it may also be used.

As the component (C), any one of the component (C-1) and the component (C-2) may be used, or the component (C-1) and the component (C-2) may be used in combination. When the curable composition of the present invention contains the component (C-1), the curable composition can be cured by irradiation with an energy ray. On the other hand, when the curable composition of the present invention contains the component (C-2), the curable composition can be cured by heating. The component (C-1) and the component (C-2) may be each used alone or may be each used in combination of two or more.

Specific examples of the photocationic catalysts include salts composed of an iodonium-based cationic species, a sulfonium-based cationic species, etc. that are cationic species, and a phosphorus-based anionic species, a boron-based anionic species, an antimony-based anionic species, an arsenic-based anionic species, a sulfonic acid-based anionic species, etc. that are anionic species, and such salts can be used alone or in combination of two or more. Specific examples thereof include, but are not limited to, salts having, as anionic species, succinimidyl camphor sulfonate, succinimidyl phenyl sulfonate, succinimidyl tolyl sulfonate, succinimidyl trifluoromethyl sulfonate, phthalimidyl trifluorosulfonate, naphthalimidyl camph[or sulfonate, naphthalimidyl methane sulfonate, naphthalimidyl trifluoromethane sulfonate, naphthalimidyl tolyl sulfonate, and norborneneimidyl trifluoromethane sulfonate.

One of the sulfonium salts that can be used as the photocationic catalyst in the present invention is a compound represented by the following formula 2. Here, R⁻ is an anion, such as hexafluoroantimonate, tetrafluoroborate, hexafluorophosphate, hexafluoroarsenate, hexachloroantimonate, trifluoromethanesulfonate ion or fluorosulfonate ion.

[Formula 2]

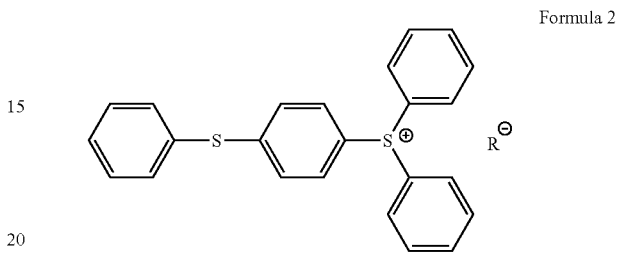

Formula 2

Examples of commercial products of the photocationic catalysts include, but are not limited to, CPI-100P, CPI-101P, CPI-110B, CPI-200K, CPI-2105, IK-1 and IK-2 manufactured by San-Apro Ltd., WPI-113, WPI-116, WPI-169, WPI-170, WPAG-336, WPAG-367, WPAG-370, WPAG-469 and WPAG-638 manufactured by FUJIFILM Wako Pure Chemical Corporation, Adeka Optomer SP-103, SP-150, SP-151, SP-170, SP-171 and SP-172 manufactured by ADEKA corporation, PC-2506, PC-2508 and PC-2520 manufactured by Polyset Company, Inc., SAN-AID SI-60, SI-80, SI-100, SI-60L, SI-80L, SI-100L, SI-L145, SI-L150, SI-L160, SI-L110 and SI-L147 manufactured by SANSHIN CHEMICAL INDUSTRY CO., LTD., and BLUESIL® P12074 manufactured by Bluestar Silicones HK.

As the thermal cationic catalyst, a thermal cationic polymerization initiator containing an amine salt, or the like can be used. The thermal cationic polymerization initiator is a compound that generates a cationic species by heating. Examples thereof include thermal cationic polymerization initiators containing salts having a quaternary ammonium cation. Especially, a salt composed of a quaternary ammonium cation and a borate anion, a salt composed of a quaternary ammonium cation and an antimony anion, and a salt composed of a quaternary ammonium cation and a phosphate anion are preferable, and a salt composed of a quaternary ammonium cation and a borate anion, and a salt composed of a quaternary ammonium cation and an antimony anion are particularly preferable because they are excellent in low-temperature curability.

Examples of the borate anions include a tetrafluoroborate anion and a tetrakis(perfluorophenyl)borate anion. Examples of the antimony anions include a tetrafluoroantimony anion and a tetrakis(perfluorophenyl)antimony anion. Examples of the phosphate anions include a hexafluorophosphate anion and a trifluoro[tris(perfluoroethyl)]phosphate anion.

Examples of commercial products of the thermal cationic catalysts include, but are not limited to, CXC-1612 and CXC-1821 as K-PURE® series manufactured by King Industries Inc.

The component (C) is preferably added in an amount of 0.01 to 5.0 parts by mass based on 100 parts by mass of the component (A). When the amount of the component (C) is 0.01 part by mass or more, the delayed curing property is more effectively exhibited, and when the amount of the component (C) is 5.0 parts by mass or less, not only is the storage stability improved but also the delayed curing time can be easily secured. When two or more compounds are used as the component (A), the amount of the component (C) added is preferably in the above range based on 100 parts by mass of the total amount of the compounds. When two or more compounds are used as the component (C), the total amount thereof is preferably in the above range.

The curable composition of the present invention may further contain a radical polymerization accelerator as a component (D). The radical polymerization accelerator is a compound that accelerates the reaction of the component (A). Although the cause is unknown, the component (A) undergoes radical polymerization to cure the composition, and the component (D) has an effect of accelerating the polymerization, despite the absence of a raw material that generates a radical species in the present invention. In the curable composition of the present invention, the component (D) as the curing accelerator can be added within limits that would not impair the storage stability. Specific examples of the component (D) include, but are not limited to, tertiary amines, such as 1,2,3,4-tetrahydroquinoline, N,N-dimethyl-aniline, N,N-dimethyl-p-toluidine, diisopropanol-p-toluidine (N,N-di(2-hydroxypropyl)-p-toluidine) and triethylamine; polyamines, such as diethylenetriamine, triethylenetetramine and pentaethylenehexamine; and thioureas, such as thiourea, ethylenethiourea, benzoylthiourea, acetylthiourea and tetramethylthiourea. As the component (D), only one may be used, or two or more may be used by mixing them. Here, when the component (D) is an amine compound, a substance other than the component (B) is selected as the component (D).

The component (D) is preferably added in an amount of 0.01 to 5.0 parts by mass based on 100 parts by mass of the component (A). When the amount of the component (D) is 0.01 part by mass or more, the delayed curing time can be moderately shortened, and when the amount of the component (D) is 5.0 parts by mass or less, the delayed curing property can be more effectively exhibited. When two or more compounds are used as the component (A), the amount of the component (D) added is preferably in the above range based on 100 parts by mass of the total amount of the compounds. When two or more compounds are used as the component (D), the total amount thereof is preferably in the above range.

To the curable composition of the present invention, an organic peroxide can be further added, but preferably, it should not be added in order to exhibit delayed curing property more effectively. Specifically, the content of the organic peroxide in the curable composition of the present invention is, for example, less than 0.1 part by mass, and preferably 0.01 part by mass or less (lower limit: 0 part by mass), based on 100 parts by mass of the component (A) (in the case of using a plurality of the components (A), 100 parts by mass of the total amount thereof). The organic peroxide is a compound in which one or two hydrogen atoms of hydrogen peroxide have been substituted by organic groups, and is, for example, a hydroperoxide. The hydroperoxide is an organic peroxide having such a structure as the following formula 3, and here, $R^1$ represents chain aliphatic hydrocarbon, cyclic aliphatic hydrocarbon, aromatic hydrocarbon, or a derivative thereof. Specific examples include, but are not limited to, p-menthane hydroperoxide, diisopropylbenzene hydroperoxide, 1,1,3,3-tetramethylbutyl hydroperoxide, cumene hydroperoxide, and t-butyl hydroperoxide.

[Formula 3]

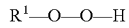

Formula 3

To the curable composition of the present invention, a chelating agent, an antioxidant, a polymerization inhibitor and a filler may be further added to such an extent that properties of the curable composition of the present invention and physical properties of a cured product are not impaired, in order to adjust the characteristics thereof.

To the curable composition of the present invention, a chelating agent may be further added for the purpose of improving storage stability. The means of adding the chelating agent is not particularly restricted, and a composition in which a chelating agent that is solid at 25° C. is dissolved in a (meth)acrylic monomer capable of dissolving a chelating agent that is solid at 25° C., or a composition in which a chelating agent that is liquid at 25° C. is made compatible with a (meth)acrylic monomer having compatibility with a chelating agent that is liquid at 25° C. can also be added. When the chelating agent is dissolved or is made compatible, it may be heated to 30 to 60° C. The chelating agent is a compound which is coordinated to a metal ion that is an impurity in the curable composition to chelate the metal and thereby inactivate the metal, and suppresses reactivity in the curable composition. On that account, by adding the chelating agent, the curable composition can maintain storage stability.

Specific examples of the chelating agents that are solid at 25° C. include, but are not limited to, EDTA.2Na and EDTA.4Na manufactured by DOJINDO LABORATORIES, and EDTA-based (ethylenediaminetetraacetic acid), NTA-based (nitrilotetraacetic acid), DTPA-based (diethylenetriaminepentaacetic acid), HEDTA-based (hydroxyethylethylenediaminetriacetic acid), TTHA-based (triethylenetetraminehexaacetic acid), PDTA-based (1,3-propanediaminetetraacetic acid), DPTA-OH-based (1,3-diamino-2-hydroxypropanetetraacetic acid), HIDA-based (hydroxyethyliminodiacetic acid), DHEG-based (dihydroxyethyl glycine), GEDTA-based (glycoletherdiaminetetraacetic acid), CMGA-based (dicarboxymethyl glutamic acid), EDDS-based ((S,S)-ethylenediaminedisuccinic acid) and EDTMP-based (ethylenediaminetetra(methylenephosphonic acid)) compounds manufactured by CHELEST CORPORATION. Specific examples of the chelating agents that are liquid at 25° C. include, but are not limited to, M-Z-8, and HEDP-based (1-hydroxyethane-1,1-diphosphonic acid), NTMP-based (nitrilotris(methylenephosphonic acid)) and PBTC-based (2-phosphono-1,2,4-butanetricarboxylic acid) compounds manufactured by CHELEST CORPORATION. These chelating agents are dissolved in or compatible with a (meth)acrylic oligomer or a (meth)acrylic monomer having high polarity, but are little or never dissolved in or compatible with an oligomer having low polarity, such as a (meth)acrylic oligomer having a main skeleton obtained by polymerizing a (meth)acrylic monomer and having a (meth)acryloyl group at an end of the main skeleton.

To the curable composition of the present invention, a polymerization inhibitor can be further added in order to further suppress viscosity change over time. Specific examples thereof include, but are not limited to, 2,6-di-t-butyl-4-methylphenol, hydroquinone, hydroquinone monomethyl ether, and 4-t-butylcatechol. The concentration of the polymerization inhibitor in the component (A) is preferably 0.01 to 5.0% by mass, and when the concentration of the polymerization inhibitor is 5.0% by mass or less, curability can be maintained.

Moreover, an antioxidant may be added according to the purpose, and specific examples thereof include, but are not limited to, a phenolic antioxidant, a thioether-based antioxidant, a phosphorus-based antioxidant, and a nitroxide-based antioxidant.

To the curable composition of the present invention, a filler such as an inorganic filler or an organic filler can be appropriately added. By adding a filler, not only viscosity thixotropic properties but also curability and toughness can be adjusted. Examples of the inorganic fillers include, but are not limited to, alumina and silica. On the other hand, examples of the organic fillers include, but are not limited to, a styrene filler, a rubber filler composed of acrylic rubber or polybutadiene rubber, and a rubber filler having a core-shell structure. A particularly preferable inorganic filler is fumed silica. Examples of the fumed silicas include, but are not limited to, hydrophilic type on a surface of which silanol remains and hydrophobic type obtained by treating the silanol with dimethyldichlorosilane or the like and thereby hydrophobizing the silica surface. Specific examples of commercial products of the hydrophilic type include AEROSIL® 90, 130, 150, 200, 255, 300 and 380 manufactured by NIPPON AEROSIL CO., LTD., and specific examples of commercial products of the hydrophobic type include AEROSIL® R972 (treated with dimethyldichlorosilane), R974 (treated with dimethyldichlorosilane), R104 (treated with octamethylcyclotetrasiloxane), R106 (treated with octamethylcyclotetrasiloxane), R202 (treated with polydimethylsiloxane), R805 (treated with octylsilane), R812 (treated with hexamethyldisilazane), R816 (treated with hexadecylsilane), and R711 (treated with methacrylsilane) manufactured by NIPPON AEROSIL CO., LTD. Other examples include CAB-O-SIL Series that are fumed silicas manufactured by Cabot Corporation.

To the curable composition of the present invention, additives, such as a photosensitizer, a silane-based coupling agent, a titanium-based coupling agent, a leveling agent, a plasticizer and a solvent, may be further added to such an extent that properties of the curable composition of the present invention and physical properties of a cured product obtained are not impaired, in order to adjust the characteristics thereof.

The curable composition of the present invention can be produced by a conventionally known method. For example, the curable composition can be produced by compounding the components (A) to (C), and if necessary, the component (D) and the above-described components other than these components in prescribed amounts, and stirring and mixing them by conventionally known means. For example, a method in which the components are weighed, introduced in a stirring vessel and stirred by a stirrer can be used. Stirring may be carried out while carrying out vacuum defoaming with a vacuum pump. The temperature for the stirring and mixing and the time for the stirring and mixing are not particularly restricted. The curable composition of the present invention is preferably produced in a light-shielded environment.

As a method for applying the curable composition of the present invention to an adherend, a known method for applying a sealant or an adhesive can be used. For example, methods, such as dispensing using an automatic coating machine, spraying, ink jet method, screen printing, gravure printing, dipping and spin coating, can be used.

The curable composition of the present invention is applicable to, as adherends, any materials on which the curable composition of the present invention can demonstrate adhesive ability, such as a metal, a resin, ceramic and glass. The resin may be any of a plastic, an elastomer and a rubber. Particularly, the curable composition of the present invention exhibits excellent delayed curing property, and therefore, coating film formation can be carried out after irradiation with an active energy ray. Conventionally, the delayed curing property is not sufficient, so that the adherend is restricted to a material that transmits an active energy ray, and irradiation with an active energy ray needs to be carried out after coating film formation is previously carried out. However, the curable composition of the present invention is applicable even to a material that is opaque to an active energy ray, and is advantageous in that there is no particular restriction on the adherend, and the application range is more widened.

For irradiation with an energy ray, various methods can be used. The energy ray refers to a ray having energy quantum among electromagnetic waves or charged particle beams, and examples include light rays and electron rays. For example, ultraviolet light having a wavelength of about 100 to 400 nm or visible light having a wavelength of about 400 to 800 nm can be preferably used. As a light source for irradiation with an energy ray, a high-pressure mercury lamp or LED can be used. A belt conveyer type irradiator equipped with a high-pressure mercury lamp, or the like can be used, and for example, an integrated light intensity of 0.1 to 60 $kJ/m^2$ is necessary. The illuminance of an LED irradiation device using LED as a light source is generally 30 to 900 $mW/cm^2$, and in some cases, it is 20 to 300 $mW/cm^2$. The light irradiation conditions can be adjusted according to the type and the amount of the raw material contained in the curable composition. Here, that the curable composition is uncured immediately after completion of irradiation of the curable composition with an energy ray and is cured after specific time has elapsed since completion of irradiation with an energy ray is referred to as "having delayed curing property." The delayed curing time may be, for example, 30 seconds to 10 hours, and is preferably 30 seconds to 3 hours, more preferably 30 seconds to 2 hours. If the delayed curing time is 30 seconds or more, sufficient time can be secured before the delayed curing property is exhibited. By securing time before exhibition of the delayed curing property, works such as laminating, tightening and fixing can be carried out. If the delayed curing time is 10 hours or less, curing can proceed more efficiently. Also, from the viewpoint of line takt in the production line, such time is preferable.

For heating, various methods can be used. Specific examples include a hot air-drying furnace and an IR furnace, and for example, the curable composition can be heated at 40 to 100° C. for 10 seconds to 24 hours. The heating conditions can be adjusted according to the type and the amount of the raw material contained in the curable composition. Here, that the curable composition is uncured immediately after completion of heating of the curable composition and is cured after specific time has elapsed since completion of heating is referred to as "having delayed curing property." The delayed curing time may be, for example, 30 seconds to 10 hours, and is preferably 30 seconds to 3 hours, more preferably 30 seconds to 2 hours. By securing time before exhibition of the delayed curing property, works such as laminating, tightening and fixing can be carried out.

The curing method for the curable composition of the present invention is, for example, a method comprising applying the curable composition of the present invention to an adherend and then irradiating the curable composition with an energy ray. For example, a curing method in which the curable composition is applied to one adherend, then the curable composition is irradiated with an energy ray, and another adherend is allowed to adhere thereto to cure the curable composition can be used. Another embodiment is a curing method in which the curable composition of the present invention is irradiated with an energy ray, then the curable composition is applied to one adherend, and another adherend is allowed to adhere thereto to cure the curable composition, but the curing method is not limited to these methods.

The curing method for the curable composition of the present invention is, for example, a method comprising applying the curable composition of the present invention to an adherend and then heating the curable composition. For example, a curing method in which the curable composition is applied to one adherend, then the curable composition is heated, and another adherend is allowed to adhere thereto to cure the curable composition can be used. Another embodiment is a curing method in which the curable composition of the present invention is heated, then the curable composition is applied to one adherend, and another adherend is allowed to adhere thereto to cure the curable composition, but the curing method is not limited to these methods.

EXAMPLES

Next, the present invention will be described in more detail with reference to Examples, but the present invention is not limited only to these Examples (hereinafter, a curable composition is also simply called a composition).

Examples 1 to 9, Comparative Examples 1 to 4

In order to prepare compositions, the following components were prepared.
Component (A): compound having (meth)acryloyl group in molecule
  2,2-Bis[4-(methacryloxyethoxy)phenyl]propane (EO: 2.3 mol) (NK Ester BPE-80N manufactured by SHIN-NAKAMURA CHEMICAL Co., Ltd.)
  Isobornyl methacrylate (LIGHT ESTER IB-X manufactured by KYOEISHA CHEMICAL CO., LTD.)
  2-Hydroxyethyl methacrylate (LIGHT ESTER HO manufactured by KYOEISHA CHEMICAL CO., LTD.)
  Methoxydiethylene glycol methacrylate (NK Ester M-20G manufactured by SHIN-NAKAMURA CHEMICAL Co., Ltd.)
  Neopentyl glycol dimethacrylate (NK Ester NPG manufactured by SHIN-NAKAMURA CHEMICAL Co., Ltd.)
  Neopentyl glycol diacrylate (NK Ester A-NPG manufactured by SHIN-NAKAMURA CHEMICAL Co., Ltd.)
  Trimethylolpropane trimethacrylate (TMPT manufactured by SHIN-NAKAMURA CHEMICAL Co., Ltd.)
Component (B): Saccharin
  Saccharin (reagent)
Component (C): Cationic Catalyst
  Component (C-1): Photocationic Catalyst
    Salt represented by the above formula 2 wherein $R^-$ is hexafluorophosphate (CPI-100P manufactured by San-Apro Ltd., solid content: 50% by mass)
  Component (C-2): Thermal Cationic Catalyst
    Quaternary ammonium salt blocked by tetrakis(perfluorophenyl)borate anion (K-PURE CXC-1821 manufactured by King Industries Inc.)
Component (D): Radical Polymerization Accelerator 1,2,3,4-Tetrahydroquinoline (Reagent)
Organic Peroxide
  Cumene hydroperoxide (PERCUMYL® H-80 manufactured by NOF CORPORATION)
Chelating Agent
  Ethylenediamine-N,N,N',N'-tetraacetic acid disodium salt dihydrate (solid at 25° C.) (2NA(EDTA2Na) manufactured by DOJINDO LABORATORIES)

Preparation of Compositions of Examples 1 to 5 and Comparative Examples 1 to 4

The components (A) to (D), the chelating agent and the organic peroxide were weighed and introduced in a stirring vessel, and they were stirred in a light-shielded state for 60 minutes, thereby obtaining compositions of Examples 1 to 5 and Comparative Examples 1 to 4. Detailed amounts for the preparation are in accordance with the following Table 1 and Table 2, and the numerical values are all expressed in part(s) by mass. In the compositions described in Table 1, the component (C-1): photocationic catalyst was added as the component (C), and in the compositions described in Table 2, the component (C-2): thermal cationic catalyst was added as the component (C).

TABLE 1

| Component | Raw material | Example 1 | Example 2 | Example 5 | Comparative Example 1 | Comparative Example 2 |
|---|---|---|---|---|---|---|
| Component (A) | BPE-80N | 70 | 70 | 70 | 70 | 70 |
|  | IB-X | 15 | 15 | 15 | 15 | 15 |
|  | HO | 15 | 15 | 15 | 15 | 15 |
| Component (B) | Saccharin | 1 | 1 | 1 |  | 1 |
| Component (C) | CPI-100P | 0.5 | 0.25 | 0.5 | 0.5 |  |
|  | CXC-1821 |  | 0.25 |  |  |  |
| Component (D) | Tetrahydroquinoline | 0.2 | 0.2 | 0.2 | 0.2 | 0.2 |
| Chelating agent | 2NA | 0.02 | 0.02 | 0.02 | 0.02 | 0.02 |
| Organic peroxide | H-80 |  |  | 1 | 1 | 1 |
| Total |  | 101.72 | 101.72 | 102.72 | 101.72 | 102.22 |

TABLE 2

| Component | Raw material | Example 3 | Example 4 | Comparative Example 3 | Comparative Example 4 |
|---|---|---|---|---|---|
| Component (A) | BPE-80N | 70 | 70 | 70 | 70 |
| | IB-X | 15 | 15 | 15 | 15 |
| | HO | 15 | 15 | 15 | 15 |
| Component (B) | Saccharin | 1 | 1 | 1 | |
| Component (C) | CXC-1821 | 0.5 | 0.5 | | 0.5 |
| Component (D) | Tetrahydroquinoline | | 0.2 | | |
| Chelating agent | 2NA | 0.02 | 0.02 | 0.02 | 0.02 |
| Total | | 101.52 | 101.72 | 101.02 | 100.52 |

Exhibition of delayed curing property of the compositions of Examples 1 and 2, Comparative Examples 1 and 2, and Example 5 was examined in accordance with Table 3 and in accordance with the following working method. As shown in FIG. 1, 0.02 g of a composition was dropped on a surface of a glass slide of length 75 mm×width 25 mm×thickness 1 mm. Another glass slide was superposed thereon in such a manner that the two glass slides were at right angles to each other so that the laminating area might become 25 mm×25 mm, and they were fixed with a fixing jig 2. The thus obtained test piece 1 was irradiated (or was not irradiated) with light in the direction vertical to a surface of the glass slide having the composition thereon under the specific light irradiation conditions of Table 3 by means of a spot irradiator. In this light irradiation, a high-pressure mercury lamp was used as a light source. After termination of the light irradiation, the test piece was allowed to stand in accordance with the standing temperature of Table 3. Here, glass was used as a material of the adherend because it was thought that, since the composition of Comparative Example 2 might exhibit anaerobic curability, metal was not able to be used. The delayed curing time was examined in the following manner. Curing was confirmed immediately after termination of light irradiation, every one minute in the first 10 minutes after termination of light irradiation, and every 10 minutes up to the longest 60 minutes after the 10 minutes, through measurement by a digital force gauge in the shearing direction. That is to say, a force of 30 N was applied using a head 3 of a digital force gauge in the traveling direction 4 of the head, and the time when fixing of the glass slide was first confirmed was recorded as delayed curing time. The results are set forth in the following Table 3. Here, "None" in the light irradiation conditions indicates that irradiation with an energy ray was not carried out. A case where curing was not confirmed is described as "x." The delayed curing time is preferably 30 seconds to 10 hours.

Exhibition of delayed curing property of the compositions of Examples 3 and 4, and Comparative Examples 3 and 4 was examined in accordance with Table 4 and in accordance with the following working method. As shown in FIG. 1, 0.02 g of a composition was dropped on a surface of a glass slide of length 75 mm×width 25 mm×thickness 1 mm. Another glass slide was superposed thereon in such a manner that the two glass slides were at right angles to each other so that the laminating area might become 25 mm×25 mm, and they were fixed with a fixing jig 2. On a hot plate having been set to the heating conditions, the thus obtained test piece 1 was placed, and heated at the specific temperature for the specific time in Table 4. After termination of heating, the test piece was allowed to stand in accordance with the standing temperature in Table 4. Thereafter, the test piece 1 was confirmed to be 25° C., and then, curing was confirmed through measurement in which while one glass slide was fixed, a force was applied to the other glass slide in the shearing direction using a digital force gauge. That is to say, whether the glass slide was fixed or not when a force of 30 N was applied using a head 3 of a digital force gauge in the traveling direction 4 of the head was confirmed. The delayed curing time was examined in the following manner. Curing was confirmed immediately after completion of heating, and every one hour up to the longest 60 hours after completion of heating, and the time when fixing of the glass slide was first confirmed was recorded as delayed curing time. The results are set forth in the following Table 4. A case where curing was not confirmed is described as "x." The delayed curing time is preferably 30 seconds to 10 hours.

TABLE 3

| Light irradiation conditions | Standing temperature | Example 1 | Example 2 | Example 5 | Comparative Example 1 | Comparative Example 2 |
|---|---|---|---|---|---|---|
| None | 25° C. | x | x | x | x | x |
| 1 kJ/m² | 25° C. | 10 min | 1 min | 1 min | x | x |

TABLE 4

| Heating conditions | Standing temperature | Example 3 | Example 4 | Comparative Example 3 | Comparative Example 4 |
|---|---|---|---|---|---|
| 60° C. × 1 min | 25° C. | x | 1 hr | x | x |
| 80° C. × 5 min | 25° C. | 1 hr | Immediately after | x | x |

In Tables 1 and 3, Examples 1, 2 and 5 were confirmed to have delayed curing property due to light when they contained the components (A) to (C) as essential components, regardless of presence or absence of the organic peroxide. On the other hand, Comparative Example 1 did not contain saccharin, and Comparative Example 2 did not contain the photocationic catalyst or the thermal cationic catalyst, and in these, delayed curing property was not confirmed. Comparative Example 2 was a composition exhibiting anaerobic curability, but the adherend was glass, so that a metal ion was not generated, and the composition was not cured.

From the comparison between Example 1 and Example 5, longer delayed curing time was obtained in Example 1 containing no organic peroxide. In the case where an organic peroxide is not used as in Example 1, delayed curing property can be exhibited more easily. On that account, desired delayed curing time can be obtained more easily.

In Tables 2 and 4, delayed curing property due to heat were confirmed in Examples 3 and 4, and moreover, it was also confirmed that the time for delayed curing changed by the presence or absence of the component (D) and the atmospheric temperature. On the other hand, Comparative Example 3 did not contain the thermal cationic catalyst, and Comparative Example 4 did not contain saccharin, and in these, delayed curing property due to the atmospheric temperature were not able to be confirmed.

Preparation of Compositions of Examples 6 to 9

The components (A) to (C) and the chelating agent were weighed and introduced in a stirring vessel, and they were stirred in a light-shielded state for 60 minutes, thereby obtaining compositions of Examples 6 to 9. Detailed amounts for the preparation are in accordance with the following Table 5, and the numerical values are all expressed in part(s) by mass. In the compositions described in Table 5, the component (C-1): photocationic catalyst was added as the component (C).

TABLE 5

| Component | Raw material | Example 6 | Example 7 | Example 8 | Example 9 |
|---|---|---|---|---|---|
| Component (A) | M-20G | 100 | | | |
| | NPG | | 100 | | |
| | A-NPG | | | 100 | |
| | TMPT | | | | 100 |
| Component (B) | Saccharin | 1 | 1 | 1 | 1 |
| Component (C) | CPI-100P | 0.5 | 0.5 | 0.5 | 0.5 |
| Chelating agent | 2NA | 0.02 | 0.02 | 0.02 | 0.02 |
| Total | | 101.52 | 101.52 | 101.52 | 101.52 |

Exhibition of delayed curing property of the compositions of Examples 6 to 9 was examined in accordance with the following Table 6 and in accordance with the following working method. As shown in FIG. 1, 0.02 g of a composition was dropped on a surface of a glass slide of length 75 mm×width 25 mm×thickness 1 mm. Another glass slide was superposed thereon in such a manner that the two glass slides were at right angles to each other so that the laminating area might become 25 mm×25 mm, and they were fixed with a fixing jig 2. The thus obtained test piece 1 was irradiated (or was not irradiated) with light in the direction vertical to a surface of the glass slide having the composition thereon under the specific light irradiation conditions of Table 6 by means of a spot irradiator. In this light irradiation, a high-pressure mercury lamp was used as a light source. After termination of the light irradiation, the test piece was allowed to stand in accordance with the standing temperature of Table 6. The delayed curing time was examined in the following manner. Curing was confirmed immediately after termination of light irradiation, every one minute in the first 10 minutes after termination of light irradiation, every 10 minutes up to 60 minutes after the 10 minutes, and every one hour up to the longest 6 hours after the 60 minutes, through measurement by a digital force gauge in the shearing direction. That is to say, a force of 30 N was applied using a head 3 of a digital force gauge in the traveling direction 4 of the head, and the time when fixing of the glass slide was first confirmed was recorded as delayed curing time. The results are set forth in Table 6. Here, "None" in the light irradiation conditions indicates that irradiation with an energy ray was not carried out. A case where curing was not confirmed is described as "x." The delayed curing time is preferably 30 seconds to 10 hours, and more preferably 30 seconds to 3 hours.

TABLE 6

| Light irradiation conditions | Standing temperature | Example 6 | Example 7 | Example 8 | Example 9 |
|---|---|---|---|---|---|
| None | 25° C. | x | x | x | x |
| 3 kJ/m² | 25° C. | 5 hr | 2 hr | 30 min | 30 min |

In Tables 5 and 6, Examples 6 to 9 all contained the components (A) to (C), and delayed curing property due to light were confirmed. Examples 6 to 9 all used a (meth)acrylic monomer as the component (A), and Examples 7 to 9 using a bifunctional monomer or a trifunctional monomer tended to have short delayed curing time as compared with Example 6 using a monofunctional monomer.

Above all, Example 9 using a trifunctional methacrylic monomer had shorter delayed curing time than Example 7 using a bifunctional methacrylic monomer. It is thought that Example 8 using an acrylic monomer among the bifunctional (meth)acrylic monomers has shorter time before curing and higher activity than Example 7 using a methacrylate monomer.

It has been found that Examples 1 and 2 mainly using, as the component (A), BPE-80N that is a (meth)acrylic monomer having a rigid bisphenol skeleton tended to be easily cured as compared with Examples 6 to 9 using a chain (meth)acrylic monomer.

It has been confirmed that by controlling the structure of the main skeleton of the component (A), the number of (meth)acryloyl groups, etc., a curable composition providing desired delayed curing time is obtained as in the above Examples 1 to 9.

INDUSTRIAL APPLICABILITY

The curable composition of the present invention stably exhibits controllable delayed curing property. Therefore, delayed curing time can be secured, and thereby, works such as laminating, tightening and fixing can be carried out regardless of whether the adherend is transparent or opaque, and the curable composition can be applied to various fields.

The present application is based on Japanese Patent Application No. 2019-213030 filed on Nov. 26, 2019, and the whole of the disclosure thereof is incorporated herein by reference.

REFERENCE SIGNS LIST

1: test piece
2: fixing jig
3: head of digital force gauge (digital force gauge main body is omitted)
4: traveling direction of head

The invention claimed is:

1. A curable composition comprising components (A) to (C):
   a component (A): a compound having a (meth)acryloyl group in a molecule,
   a component (B): saccharin, and
   a component (C): a photocationic catalyst as a component (C-1), wherein the photocationic catalyst generates an acid by irradiation with an energy ray,
   wherein the curable composition comprises no organic peroxide,
   the component (C-1) is a salt composed of a cationic species and an anionic species,
   the cationic species is selected from the group consisting of an iodonium-based cationic species and a sulfonium-based cationic species,
   the anionic species is selected from a group consisting of a phosphorus-based anionic species, a boron-based anionic species, an antimony-based anionic species, an arsenic-based anionic species, and a sulfonic acid-based anionic species, and
   the curable composition, which is not under an anaerobic condition, is capable of being in an uncured state immediately after completion of the irradiation with the energy ray and being cured after specific time has elapsed since the completion of the irradiation with the energy ray.

2. The curable composition according to claim 1, further comprising a radical polymerization accelerator as a component (D).

3. The curable composition according to claim 2, wherein the component (D) is an amine compound other than the component (B).

4. The curable composition according to claim 1, wherein the specific time is 30 seconds to 10 hours.

5. The curing composition according to claim 1, wherein the component (C-1) is a compound represented by the following formula 2:

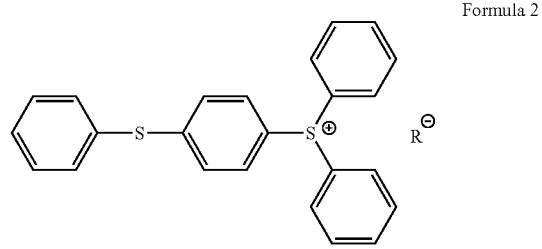

Formula 2 wherein $R^-$ is an anion selected from the group consisting of hexafluoroantimonate, tetrafluoroborate, hexafluorophosphate, hexafluoroarsenate, hexachloroantimonate, trifluoromethanesulfonate ion, and fluorosulfonate ion.

6. A curable composition comprising components (A) to (C):
   a component (A): a compound having a (meth)acryloyl group in a molecule,
   a component (B): saccharin, and
   a component (C): a thermal cationic catalyst as a component (C-2),
   wherein the thermal cationic catalyst generates an acid by heating, and
   the curable composition, which is not under an anaerobic condition, is capable of being in an uncured state immediately after completion of the heating and being cured after specific time has elapsed since the completion of the heating.

7. The curable composition according to claim 6, comprising no organic peroxide.

8. A curable composition comprising components (A) to (C):
   a component (A): a compound having a (meth)acryloyl group in a molecule,
   a component (B): saccharin, and
   a component (C): a photocationic catalyst as a component (C-1) and a thermal cationic catalyst as a component (C-2),
   wherein the photocationic catalyst generates a first acid by irradiation with an energy ray, and the thermal cationic catalyst generates a second acid by heating, and
   the curable composition, which is not under an anaerobic condition, is capable of being in an uncured state immediately after completion of the irradiation with the energy ray or the heating and being cured after specific time has elapsed since the completion of the irradiation with the energy ray or the heating.

9. A curing method comprising applying the curable composition according to claim 1 to an adherend and then irradiating the curable composition with an energy ray.

10. A curing method comprising applying the curable composition according to claim 6 to an adherend and then heating the curable composition.

* * * * *